(12) United States Patent
Fellenstein et al.

(10) Patent No.: US 6,457,719 B1
(45) Date of Patent: Oct. 1, 2002

(54) BRUSH SEAL

(75) Inventors: James Fellenstein, Hebron, CT (US); Sean P. McCutchan, Enfield, CT (US); James Hyland, Farmington, CT (US); Keven G. Van Duyn, Bloomfield, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/638,224

(22) Filed: Aug. 14, 2000

(51) Int. Cl.$^7$ .............................................. E16J 15/44
(52) U.S. Cl. ...................................................... 277/355
(58) Field of Search ........................................ 277/355

(56) References Cited

U.S. PATENT DOCUMENTS

| | | |
|---|---|---|
| 885,032 A | 4/1908 | De Ferranti |
| 899,319 A | 9/1908 | Parsons et al. |
| 3,580,692 A | 5/1971 | Mikolajczak ............... 415/174 |
| RE30,206 E | 2/1980 | Ferguson et al. ........... 415/174 |
| 4,809,990 A | 3/1989 | Merz ............................ 277/53 |
| 5,029,875 A | 7/1991 | Spain et al. ................... 277/1 |
| 5,066,024 A * | 11/1991 | Reisinger et al. ........... 277/355 |
| 5,066,025 A | 11/1991 | Hanrahan .................... 277/53 |
| 5,088,888 A | 2/1992 | Bobo ...................... 415/170.1 |
| 5,090,710 A | 2/1992 | Flower ........................ 277/53 |
| 5,106,104 A * | 4/1992 | Atkinson et al. ........... 277/355 |
| 5,108,116 A | 4/1992 | Johnson et al. ............... 277/53 |
| 5,174,582 A | 12/1992 | Ferguson ..................... 277/53 |
| 5,181,728 A | 1/1993 | Stec ............................ 277/53 |
| 5,308,088 A | 5/1994 | Atkinson et al. ............. 277/53 |
| 5,318,309 A * | 6/1994 | Tseng et al. ................ 277/355 |
| 5,335,920 A | 8/1994 | Tseng et al. .................... 277/1 |
| 5,401,036 A | 3/1995 | Basu ............................ 277/53 |
| 5,496,045 A | 3/1996 | Millener et al. .............. 277/53 |
| 5,884,918 A | 3/1999 | Basu et al. ................. 277/355 |
| 5,975,535 A | 11/1999 | Gail et al. .................. 277/355 |
| 6,032,959 A | 3/2000 | Carter ........................ 277/355 |
| 6,173,962 B1 * | 1/2001 | Morrison et al. ........... 277/355 |
| 6,254,344 B1 * | 7/2001 | Wright et al. ............... 277/355 |
| 6,293,554 B1 * | 9/2001 | Dinc et al. .................. 277/355 |

FOREIGN PATENT DOCUMENTS

| | | |
|---|---|---|
| GB | 1 598 926 | 9/1981 |
| GB | 2 258 277 A | 2/1993 |
| WO | WO 92/05378 | 4/1992 |
| WO | WO 92/14951 | 9/1992 |

* cited by examiner

*Primary Examiner*—Anthony Knight
*Assistant Examiner*—E Peavey
(74) *Attorney, Agent, or Firm*—Brian J. Hamilla; Richard D. Getz

(57) ABSTRACT

According to the present invention, a brush seal is provided having a side plate, a back plate, and a bristle pack disposed between the side plate and the back plate. The side plate is in contact with an upstream surface of the bristle pack. The back plate is in contact with a downstream surface of the bristle pack. The back plate includes a plurality of apertures positioned to provide a gas path through the back plate for gas exiting the bristle pack. In some embodiments, the back plate further includes an exit channel disposed in the back plate surface contiguous with the bristle pack, aligned with the apertures. In some embodiments, the radial length of the side plate in contact with the bristle pack is less than the radial length of the back plate in contact with the bristle pack.

18 Claims, 2 Drawing Sheets

BRUSH SEAL

BACKGROUND OF THE INVENTION

1. Technical Field

This invention pertains to seals for turbine engines in general and to brush seals in particular.

2. Background Information

Brush seals are designed to provide a controlled leakage flow from a higher pressure region to a lower pressure region through a gap disposed between a stationary member and a rotating member. The sealing is providing by a plurality of bristles packed between a side plate and a back plate. The side plate is located on the high pressure ($P_H$) side of the seal and the back plate is located on the low pressure ($P_L$) side of the seal. The bristles extend beyond the side and back plates, across the gap between the stationary and rotating members.

Referring to FIG. 1, one form of brush seal deterioration that can result in higher than expected levels of seal leakage is described below. Generally the leakage flow velocity component in the aft direction through a brush seal bristle pack 104 is nearly independent of radial location (assuming a uniform profile) at each of the upstream 102 and downstream 105 surfaces of the bristle pack 104. Due to seal stiffness and pressure requirements, in a traditional brush seal 100 the area of bristle pack upstream surface 102 exposed to the higher pressure $P_H$ is typically much larger than the area of bristle pack downstream surface 105 exposed to the lower pressure $P_L$. From flow continuity it can be shown that the average aft component of fluid velocity is significantly larger at the downstream surface 105 than at the upstream surface 102. Because the forces acting on the bristles in the flow direction are expected to increase with increasing flow velocity, it is recognizable that the aft most bristles experience the highest forces. Such loading causes high bending stress in the bristles at the cantilever formed by the backing plate, and may eventually lead to bristle failure that progresses from aft forward. A person of skill in the art will recognize that an increased leakage rate though brush seals within a gas turbine engine can directly decrease the thrust specific fuel consumption (TSFC) of the engine and consequently the efficiency of the engine.

What is needed is a durable brush seal that can be used in a gas turbine engine environment, and one that maintains its designed leakage flow rate during operation.

DISCLOSURE OF THE INVENTION

According to the present invention, a brush seal is provided having a side plate, a back plate, and a bristle pack disposed between the side plate and the back plate. The side plate is in contact with an upstream surface of the bristle pack. The back plate is in contact with a downstream surface of the bristle pack. The back plate includes a plurality of apertures positioned to provide a gas path through the back plate for gas exiting the bristle pack. In some embodiments, the back plate further includes an exit channel disposed in the back plate surface contiguous with the bristle pack, aligned with the apertures. In some embodiments, the radial length of the side plate in contact with the bristle pack is less than the radial length of the back plate in contact with the bristle pack.

An advantage of the present invention is that an increased durability brush seal is provided. Under normal operating conditions, traditional brush seals can prematurely deform by deflecting in the direction of the leakage flow through the seal. This type of deformation is a function of the pressure difference across the seal and more specifically the velocity of the flow passing through the bristle pack. In a traditional brush seal having a side plate radially shorter than the back plate, the velocity of the leakage flow in the region adjacent the edge of the back plate is appreciably higher than elsewhere in the bristle pack. As a result, the bristles in the region adjacent the edge of back plate are subject to the highest loading, which increases their susceptibility to deformation. In the event of such a deformation, the leakage flow rate is dramatically increased and the seal function comprised. The present brush seal substantially decreases velocity of the leakage flow in the region adjacent the edge of the back plate by providing an alternative leakage path through the back plate of the brush seal. As a result, the bristle loading in the region adjacent the edge of back plate is less than in prior art brush seals of which we are aware. In addition, leakage flow through the bristle pack region between the back plate and the sealing surface is also less than in prior art brush seals, thereby further reducing the loading on the bristle pack and the consequent probability of deformation.

These and other objects, features and advantages of the present invention will become apparent in light of the detailed description of the best mode embodiment thereof, as illustrated in the accompanying drawings.

DETAILED DESCRIPTION OF THE INVENTION

Figure 2:
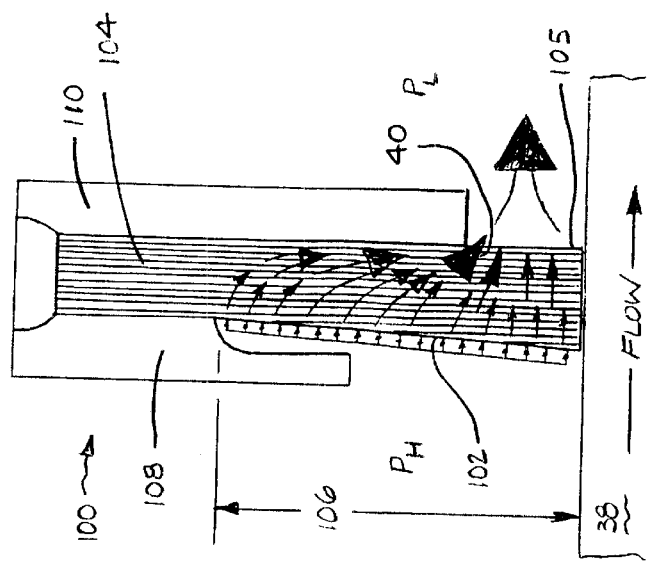
FIG. 2 shows a diagrammatic representation of controlled leakage through a prior art brush seal, including flow velocity vectors.
Figure 1:
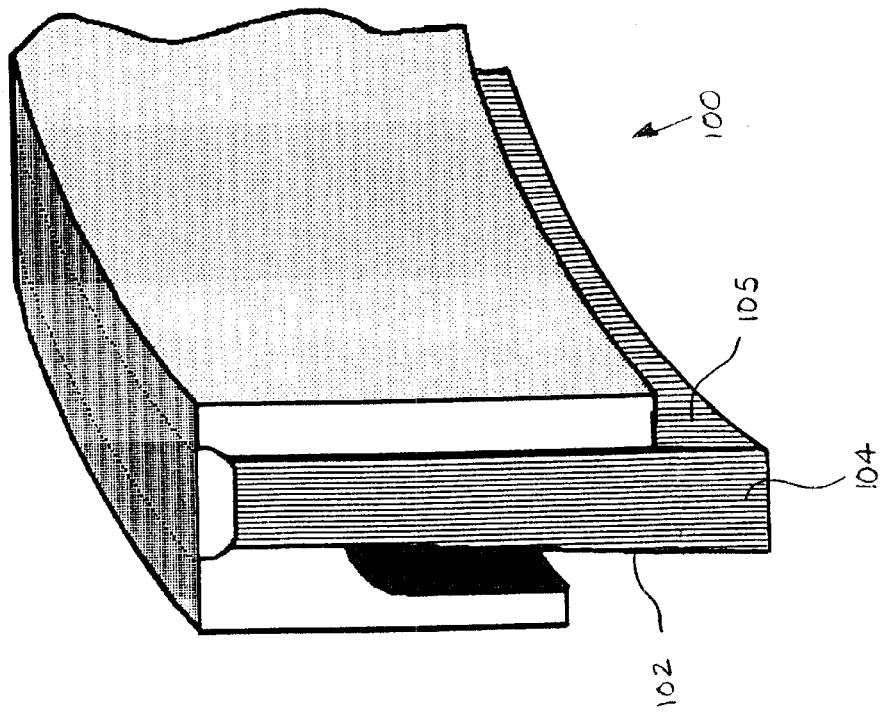
FIG. 1 shows a diagrammatic perspective partial view of a prior art brush seal.

The present brush seal 10 includes a side plate 12, a back plate 14, and a bristle pack 16 disposed between the side plate 12 and the back plate 14. The bristle pack 16 consists of a plurality of bristles 18 attached to one another at their base. The side plate 12 is in contact with an upstream surface 20 of the bristle pack 16, and the back plate 14 is in contact with a downstream surface 22 of the bristle pack 16. Preferably, the radial length 24 of the side plate 12 in contact with the bristle pack 16 is less than the radial length 26 of the back plate 14 in contact with the bristle pack 16. In some embodiments, the brush seal 10 further includes a windage cover 28 extending out from the side plate 12 generally parallel to the bristle pack 16, consequently forming a supply channel 30 between the windage cover 28 and the bristle pack 16. The back plate 14 includes a plurality of apertures 32 positioned to provide a gas path through the back plate 14 for gas exiting the bristle pack 16. The apertures 32 shown are circular. Other aperture geometries may be used alternatively (e.g. slots, ovals, etc.). The cross-sectional area of the apertures 32 is selected for the application at hand to provide the desired leakage flow rate. The back plate 14 preferably further includes an exit channel 34 disposed in the surface 36 of the back plate 14 that is contiguous with the bristle pack 16, aligned with the apertures 32. The exit channel 34 provides a circumferential path for leakage flow exiting the bristle pack 16. In some applications, it may be advantageous to segment the exit channel 34 into a plurality of circumferentially extending slots.

Figure 4:
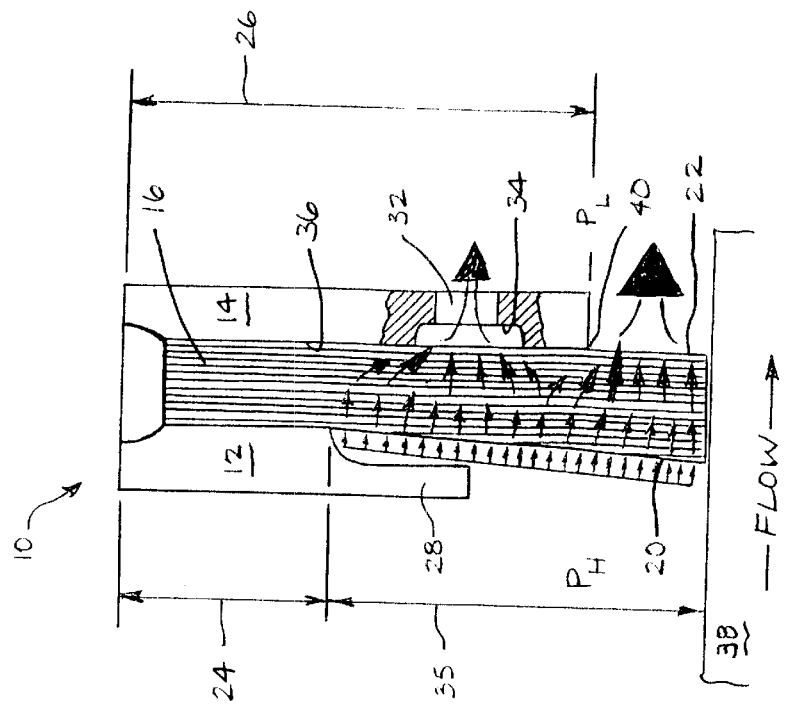
FIG. 4 shows a diagrammatic representation of controlled leakage through a present invention brush seal, including flow velocity vectors.
Figure 3:
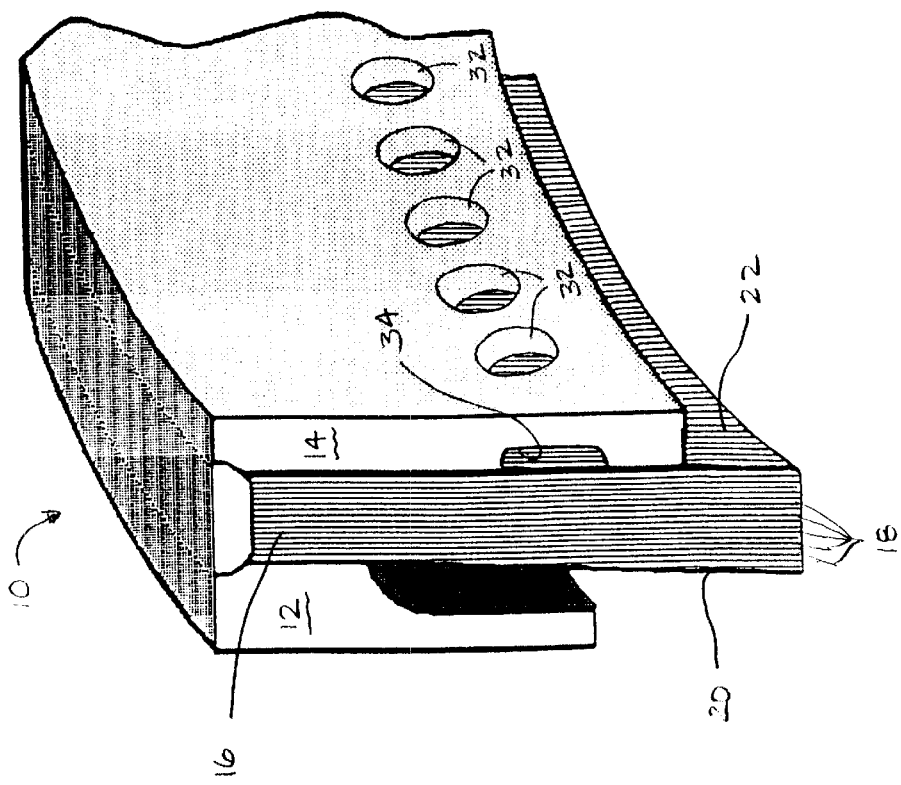
FIG. 3 shows a diagrammatic perspective partial view of a present invention brush seal.

Referring to FIGS. 2 and 4, the leakage flow through a traditional brush seal 100 (FIG. 2) and through the present invention brush seal 10 (FIG. 4) are diagrammatically shown from a high pressure side ($P_H$) to a low pressure side ($P_L$). In both brush seals it can be assumed that the leakage flow enters the bristle pack substantially uniform in velocity along the radial length 35 of the bristle pack exposed to the leakage flow. In the traditional brush seal 100 (FIG. 2), leakage flow entering the portion of the bristle pack 104 exposed by the shorter side plate 108 must travel radially within the bristle pack 104 prior to exiting over the back plate 110 of the bristle pack 104. The size of the arrows diagrammatically illustrate the higher velocity of the leakage flow in the region adjacent the edge of the back plate. The problems associated with that higher velocity are discussed above. In the present invention brush seal 10 (FIG.4), leakage flow entering the portion of the bristle pack 16 in contact with the back plate 14 is permitted to exit the bristle pack 16 via the apertures 32 in the backing plate 14. In the embodiments having an exit channel 34 aligned with the apertures 32, leakage flow is allowed to exit the bristle pack 16 along a continuous annular path (or substantially continuous for those channels that are segmented) prior to exiting via the apertures 32. In all embodiments of the present seal 10, the leakage flow through the back plate 14 decreases the amount of flow that must travel radially through the bristle pack 16 and subsequently exit through the portion of the bristle pack extending between the back plate 14 and the seal surface 38. More importantly, the increased velocity flow in the region 40 adjacent the edge of the back plate 14 is diminished and therefore the associated undesirable forces as well.

Although this invention has been shown and described with respect to the detailed embodiments thereof, it will be understood by those skilled in the art that various changes in form and detail thereof may be made without departing from the spirit and scope of the claimed invention.

What is claimed is:

1. A brush seal, comprising:
   a side plate;
   a back plate having a plurality of tapered apertures; and
   a plurality of bristles disposed between to said side plate and said back plate, wherein said apertures in said back plate provide a gas path for gas exiting said bristles through said back plate.

2. A brush seal, comprising:
   a side plate;
   a back plate having a plurality of apertures and an exit channel disposed in a surface of said back plate contiguous with said bristles, said exit channel aligned with said apertures; and
   a plurality of bristles disposed between said side plate and said back plate, wherein said apertures in said back plate provide a gas path for gas exiting said bristles through said back plate.

3. The brush seal of claim 2, wherein said exit channel extends continuously in said back plate.

4. The brush seal of claim 2, wherein said exit channel is segmented.

5. The brush seal of claim 1 wherein said back plate has a greater bristle contact area than said side plate.

6. The brush seal of claim 5, further comprising a windage cover attached to said side plate, wherein said windage cover is separated from said bristles by a supply channel.

7. A brush sea, comprising:
   a side plate;
   a back plate having a plurality of apertures and a greater bristle contact area than said side plate;
   a plurality of bristles disposed between said side plate and said back plate;
   a windage cover attached to said side plate, said windage cover separated from said bristles by a supply channel;
   an exit channel disposed in a surface of said back plate contiguous with said bristles, said exit channel aligned with said apertures;
   wherein said apertures in said back plate provide a gas path for gas exiting said bristles through said back plate.

8. The brush seal of claim 7, wherein said exit channel extends continuously in said back plate.

9. The brush seal of claim 8, wherein said exit channel is segmented.

10. The brush seal as recited in claim 1, wherein said apertures taper in a downstream direction.

11. The brush seal as recited in claim 1, wherein said plurality of apertures include at least one upstream opening and a plurality of downstream exits.

12. A back plate of a brush seal, comprising:
    an upstream end;
    a downstream end; and
    at least one aperture extending from said upstream end to said downstream end;
    wherein said at least one aperture has a continuous opening along said upstream end and a plurality of exits.

13. The back plate as recited in claim 12, wherein said opening is annular.

14. The back plate as recited in claim 12, in combination with a side plate and a plurality of bristles disposed therebetween to form a brush seal.

15. A back plate for a brush seal, comprising:
    an upstream end;
    a downstream end; and
    a gas path between said upstream end and said downstream end, said path having an opening at said upstream end and a plurality of exits at said downstream end;
    wherein said opening is larger than said plurality of exits and is in communication with said plurality of exits.

16. The back plate as recited in claim 15, wherein said opening is continuous along said upstream end.

17. The back plate as recited in claim 16, wherein said opening is annular.

18. The back plate as recited in claim 15, in combination with a side plate and a plurality of bristles disposed therebetween to form a brush seal.

* * * * *